Patented Mar. 3, 1953

2,630,404

UNITED STATES PATENT OFFICE 2,630,404

HYDROCARBON CONVERSION PROCESS

Charles V. Berger, Western Springs, Ill., assignor to Universal Oil Products Company, Chicago, Ill., a corporation of Delaware No Drawing. Application August 17, 1949, Serial No. 110,871

11 Claims. (Cl. 196—50)

This invention relates to the catalytic conversion of hydrocarbon fractions containing olefins. It is more specifically concerned with a method of reforming a thermally cracked gasoline or naphtha in admixture with a straight-run gasoline or naphtha in the presence of hydrogen and a catalyst comprising platinum and alumina.

Catalysts comprising platinum and alumina, and particularly platinum-alumina catalysts containing combined halogen, such as combined fluorine or chlorine, are especially useful in the reforming of saturated hydrocarbons. Hydrocracking and isomerization of paraffins, and dehydrogenation of naphthenes are among the principal reactions that are promoted by these catalysts, which are capable of increasing the octane number of straight-run gasolines and naphthas to values that are substantially higher than those that ordinarily can be reached by thermal reforming. In addition, the yield-octane number relationship realized with these catalysts are much better than are the corresponding relationships obtained in thermal reforming and in most of the prior catalytic reforming processes. By an appropriate selection of operating conditions, catalysts of this type can be used for a number of weeks and even months without regeneration.

The reforming of straight-run gasolines and naphthas in the presence of these catalysts is endothermic, the degree of endothermicity depending primarily upon the extent of conversion, particularly the relative amounts of hydrocracking, which is exothermic, and aromatization, which is endothermic. In a system applying adiabatic reactors, the over-all temperature drop can be as much as 200° F. or more. Consequently, if it is desired to conduct the reforming operation at a relatively constant temperature at or near the optimum with platinum-alumina catalyst in fixed bed operation, it is necessary to use heated reactors or a large number of adiabatic reactors with interheating. Both of these methods possess certain disadvantages, hence it would be desirable if a single adiabatic reactor, or at most only a few adiabatic reactors, could be employed without encountering the aforementioned large temperature drop. A possible solution comprises the addition of olefinic hydrocarbons to the straight-run charging stock. The heat evolved by the hydrogenation of the olefins would then compensate, at least in part, for the endothermic heat of reaction of naphthene dehydrogenation. However, it is known that olefins poison platinum catalysts, hence it would appear that the advantages to be gained by eliminating the large endothermic heat of reaction would be at the expense of catalyst life. Nevertheless, I have discovered operating conditions at which olefinic hydrocarbons may be reformed in the presence of a particular type of platinum catalyst with little or no poisoning of the catalyst by the olefins.

In one embodiment my invention relates to a process which comprises contacting a charging stock comprising an olefinic hydrocarbon with a catalyst comprising platinum and alumina at a pressure greater than about 100 p. s. i. and a temperature of from about 750° to about 1000° F.

In a more specific embodiment my invention relates to a reforming process which comprises subjecting a mixture comprising a straight-run gasoline fraction and a thermally cracked gasoline fraction to the action of a catalyst comprising platinum, alumina, and combined halogen at a pressure of from about 100 to about 1500 p. s. i., a temperature of from about 750° F. to about 1000° F., and a weight hourly space velocity of from about 0.2 to about 40, in the presence of hydrogen in a mol ratio of from about 0.5 to about 15 mols of hydrogen per mol of hydrocarbon.

The two operating conditions that appear to be the most important in eliminating the poisoning effect of olefinic hydrocarbons with the particular type of platinum catalyst that I employ are pressure and temperature. The reaction pressure should be in excess of about 100 p. s. i. g. At lower pressures, particularly at atmospheric pressure, at which most of the prior workers conducted their experiments, the life of the catalyst is a great deal shorter. Comparative experiments with charging stocks consisting of straight-run gasoline on the one hand and a mixture of straight-run and thermally cracked gasolines on the other hand, indicate that it is the presence of the olefins at these low pressures that is influential in bringing about deactivation of the catalyst. The temperature should be from about 750° F. to about 1000° F., preferably greater than about 850–875° F.

The weight hourly space velocity at which my process is conducted, said space velocity being defined as the weight of hydrocarbon charge per hour per weight of catalyst in the reaction zone, should be within the range of from about 0.2 to about 40. When hydrogen is employed, the amount charged will usually be from about 0.5 to about 15 mols per mol of hydrocarbon charge. In the preferred types of operation, hydrogen is employed, although it is possible in some operations to dispense with its use. The latter type of operation can be employed successfully, for example, when charging a straight-run gasoline with a high naphthene content together with a comparatively small amount of olefins. The hydrogen liberated by dehydrogenation of the naphthenes and by dehydrogenation of cycloolefins containing six carbon atoms in the ring can be utilized for hydrogenation of the remaining olefins. In the preferred type of operation, my process is conducted in such a manner that there is no net consumption of hydrogen.

The olefinic hydrocarbons that are employed in my process for the purpose of being hydrogenated and thereby liberating heat to compensate for the endothermic dehydrogenation of naphthenes, comprises primarily aliphatic olefins. Cyclic olefins also may be employed, but if the same contain 6 carbon atoms in the ring, they generally will be dehydrogenated to the corresponding benzene compound. I prefer to use olefins that boil within the gasoline range because the use of higher or lower boiling olefins ordinarily would necessitate removal of their saturated counterparts from the reformate. An especially desirable type of olefinic charging stock comprises thermally cracked or thermally reformed gasoline, particularly the higher boiling fractions thereof, such as the 200–400° F. fraction. Thermal naphthas of this type ordinarily are of poor quality from an antiknock point of view. The olefins contained therein will be hydrogenated to the corresponding paraffins and some of the paraffins thus produced will be hydrocracked to lower boiling paraffins of increased antiknock quality. In addition, some of the olefins will be isomerized by the catalyst I use to more branched chain structures before hydrogenation, with the result that the octane number of the hydrogenated olefin will be enhanced. Some of the low octane number paraffins in the thermal naphtha will be hydrocracked and the naphthenes will be dehydrogenated to the corresponding aromatics. Thus, the addition of such naphthas not only reduces the magnitude of the endothermic heat of reaction of reforming straight-run gasolines, but, in addition, results in an upgrading of the thermal naphtha. The decreased temperature drop permits operation closer to optimum temperatures. The low boiling portions of the thermal gasolines usually possess a rather high antiknock rating, hence it generally is preferable not to reform these portions of the gasoline, but rather to blend them with the reformate produced in my process.

The nonolefinic stocks that may be converted in admixture with olefinic stocks in accordance with my process comprise hydrocarbon fractions containing naphthenes and paraffins. The preferred stocks are those consisting essentially of naphthenes and paraffins although minor amounts of aromatics also may be present. This preferred class includes straight-run gasolines, natural gasolines, and the like. The gasoline may be a full boiling range gasoline having an initial boiling point within the range of from about 50° to about 100° F. and an end boiling point within the range of from about 325° to about 425° F., or it may be a selected fraction thereof which usually will be a higher boiling fraction, commonly referred to as naphtha, and generally having an initial boiling point within the range of from about 125° to about 250° F. and an end boiling point within the range of from about 350° F. to about 425° F.

The catalysts comprising platinum and alumina that are preferred for use in my hydrocarbon reforming process may contain substantial amounts of platinum, but, for economic as well as for product yield and quality reasons, the platinum content usually will be within the range of from about 0.05% to about 1.5%. The catalyst ordinarily will contain a relatively minor amount, usually less than about 3% on a dry alumina basis, of a halogen, especially fluorine and chlorine. One method of preparing such catalysts comprises adding a suitable alkaline reagent such as ammonium hydroxide or carbonate to a salt of aluminum such as aluminum chloride, aluminum sulfate, aluminum nitrate, and the like, in an amount sufficient to form aluminum hydroxide, which upon drying, are converted to alumina. The halogen may be added to the resultant slurry in the form of an acid such as hydrogen fluoride or hydrogen chloride, or as a volatile salt such as ammonium chloride. The fluoride ion appears to be somewhat more active in promoting hydrocracking than other members of the halide group, and, therefore, somewhat smaller amounts of the halide group ordinarily are used.

A satisfactory method of adding platinum to the alumina or alumina-halogen composite comprises preparing a colloidal suspension of platinic sulfide by introducing hydrogen sulfide into an aqueous solution of chloroplatinic acid until said solution reaches a constant color, which usually is a dark brown. The resultant colloidal suspension of platinic sulfide is commingled with the aluminum hydroxide slurry at room temperature followed by stirring to obtain intimate mixing. The resulting material is then dried at a temperature from about 200° to about 400° F. for a period from about 4 to about 24 hours or more to form a cake. This material may then be converted into pills or other shaped particles. Thereafter the catalyst may be subjected to a high temperature calcination or reduction treatment prior to use. It is to be understood that the foregoing method of preparing satisfactory platinum-alumina catalyst is merely illustrative and is not to be taken in a limitative sense inasmuch as various other methods may be employed to produce satisfactory catalysts of this type.

The exact manner in which the halogen or halide ion is present in the catalyst is not known, although it is believed to be present in the form of a chemical combination or loose complex with the alumina and/or platinum components. Because the exact chemical constitution of such halogen containing catalyst is not known, I sometimes refer to them as "catalysts comprising platinum, alumina, and halogen" or "catalysts comprising platinum, alumina, and combined halogen."

The following example is given to illustrate my invention, but it is to be understood that it is given for illustrative and not for limitative purposes.

EXAMPLE

A charging stock comprising a mixture of 30% of a full boiling thermally cracked gasoline and 70% of a full boiling straight-run gasoline was reformed in fixed bed operation by passing it through catalyst comprising alumina containing 0.3% platinum and 0.3% fluorine, made in accordance with the procedure outlined above. The properties of the charging stock, the operating conditions, and the results are shown in the following table:

*Charge Stock*

| Days on Stream | | 1 | 2 | 3 |
|---|---|---|---|---|
| Catalyst Temperature, °F | | 874 | 874 | 873 |
| Pressure, p. s. i. g | | 500 | 500 | 500 |
| Wt. Hourly Space Velocity | | 2 | 2 | 2 |
| Hydrogen/Hydrocarbon Molal Ratio | | 3 | 3 | 3 |
| Reformate Yield, Wt. Percent | | 94.2 | 94.2 | 94.0 |
| Properties of Charge Stock and Reformate: | | | | |
| RVP, lbs | 3.0 | 7.6 | 8.0 | 7.8 |
| Bromine No | 25 | <1 | <1 | <1 |
| Dispersion | 83.1 | 103.8 | 104.3 | 104.1 |
| Octane Nos.: | | | | |
| F-1 clear | 49.8 | 79.0 | 78.2 | 79.1 |
| F-1+3 ccs. TEL | 68.4 | 90.8 | 90.5 | 90.2 |
| Hydrocracking, Volume Percent [1] | | 10.5 | 10.5 | 10.5 |
| Carbon on Catalyst, Wt. Percent | | | | 0.24 |

[1] Percent over at 212° F.+loss in ASTM distillation of reformate minus percent over at 212° F.+loss in product.

It can be seen that during the three-day period there was substantially no decrease in the yield and quality of the product. The degree of hydrocracking and the amount of aromatization, as measured by the dispersion, were essentially constant. The carbonization of the catalyst under these conditions was very small. This experiment was conducted in a laboratory pilot plant having a heated reaction zone, hence the effect of the olefins in reducing the endothermicity of the reaction was not readily measurable. However, experiments in adiabatic reactors satisfactorily establish this point.

An important feature of my process is that the bromine number of the product is substantially zero. As a consequence, my product is especially suitable for use in aviation gasoline blends, in which significant concentrations of olefins cannot be tolerated. In the prior art processes, as exemplified by Patent No. 2,427,800, the products contained appreciable amounts of unsaturated hydrocarbons.

From the foregoing description, it can be seen that I have invented a method of reforming olefin-containing hydrocarbon charging stocks in the presence of a particular type of platinum catalyst without appreciable poisoning of said catalyst. My process is especially beneficial when reforming mixtures of straight-run and thermal gasoline fractions. The presence of the thermally cracked gasoline reduces the net endothermicity of the reaction, thereby permitting operation at a more nearly constant temperature, and at the same time the quality of the thermal gasoline fraction is substantially enhanced. My process is characterized by high yields and long catalyst life.

I claim as my invention:

1. A process which comprises contacting a straight-run gasoline fraction together with an olefinic hydrocarbon with a catalyst comprising platinum and alumina at a pressure greater than about 100 p. s. i. and a temperature of from about 750° to about 1000° F.

2. A process which comprises contacting hydrogen and a charging stock comprising a straight-run gasoline fraction and a cracked hydrocarbon fraction boiling in the gasoline range with a catalyst comprising platinum and alumina at a pressure greater than about 100 p. s. i. and a temperature of from about 750° F. to about 1000° F. for a period of time sufficient to increase the octane number of the straight-run fraction.

3. A process which comprises contacting hydrogen and a charging stock comprising a straight-run gasoline fraction and a cracked hydrocarbon fraction boiling in the gasoline range with a catalyst comprising platinum, alumina, and combined halogen at a pressure greater than about 100 p. s. i. and a temperature of from about 750° to about 1000° F. for a period of time sufficient to increase the octane number of the straight-run fraction.

4. The process of claim 3 further characterized in that said combined halogen comprises fluorine.

5. The process of claim 3 further characterized in that said combined halogen comprises chlorine.

6. A reforming process which comprises subjecting a mixture comprising a straight-run gasoline fraction and a thermally cracked gasoline fraction to the action of a catalyst comprising platinum and alumina at a pressure of from about 100 to about 1500 p. s. i., a temperature of from about 750° to about 1000° F., and a weight hourly space velocity of from about 0.2 to about 40, in the presence of hydrogen in a mol ratio of from about 0.5 to about 15 mols of hydrogen per mol of hydrocarbon.

7. A reforming process which comprises subjecting a mixture comprising a straight-run gasoline fraction and a thermally cracked gasoline fraction to the action of a catalyst comprising platinum, alumina, and combined halogen at a pressure of from about 100 to about 1500 p. s. i., a temperature of from about 750° F. to about 1000° F., and a weight hourly space velocity of from about 0.2 to about 40, in the presence of hydrogen in a mol ratio of from about 0.5 to about 15 mols of hydrogen per mol of hydrocarbon.

8. The process of claim 7 further characterized in that said combined halogen comprises fluorine.

9. The process of claim 7 further characterized in that said combined halogen comprises chlorine.

10. A reforming process which comprises subjecting a mixture comprising a straight-run gasoline fraction and a gasoline fraction containing olefinic hydrocarbons to the action of a catalyst comprising platinum and alumina at a pressure of from about 100 to about 1500 p. s. i., a temperature of from about 750° to about 1000° F., and a weight hourly velocity of from about 0.2 to about 40, in the presence of hydrogen in a mol ratio of from about 0.5 to about 15 mols of hydrogen per mol of hydrocarbon.

11. A reforming process which comprises subjecting a mixture comprising a straight-run gasoline fraction and a gasoline fraction containing olefinic hydrocarbons to the action of a catalyst comprising platinum, alumina, and combined halogen at a pressure of from about 100 to about 1500 p. s. i., a temperature of from about 750° F. to about 1000° F., and a weight hourly space velocity of from about 0.2 to about 40, in the presence of hydrogen in a mol ratio of from about 0.5 to about 15 mols of hydrogen per mol of hydrocarbon.

CHARLES V. BERGER.

REFERENCES CITED

The following references are of record in the file of this patent:

UNITED STATES PATENTS

| Number | Name | Date |
|---|---|---|
| 2,352,025 | Seguy | June 20, 1944 |
| 2,400,795 | Watson | May 21, 1946 |
| 2,411,726 | Holroyd et al. | Nov. 26, 1946 |
| 2,423,328 | Layng | July 1, 1947 |
| 2,427,800 | Mattox | Sept. 23, 1947 |
| 2,479,110 | Haensel | Aug. 16, 1949 |

FOREIGN PATENTS

| Number | Country | Date |
|---|---|---|
| 423,001 | Great Britain | Jan. 23, 1935 |

OTHER REFERENCES

Taylor et al., "Trans. Faraday Soc.," vol. 35, pages 921–34 (1939).

Komarewsky et al., "The Oil and Gas Journal," of June 24, 1943, pages 90–93 and 113.